US012777260B2

(12) United States Patent
Kwon et al.

(10) Patent No.: US 12,777,260 B2
(45) Date of Patent: Oct. 27, 2026

(54) METHOD AND APPARATUS WITH MACHINE-PERSPECTIVE SIGNAL PROCESSING

(71) Applicant: Samsung Electronics Co., Ltd., Suwon-si (KR)

(72) Inventors: Kinam Kwon, Suwon-si (KR); Seo Hee So, Suwon-si (KR); Hyochul Kim, Suwon-si (KR); Sungmo Ahn, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 18/816,848

(22) Filed: Aug. 27, 2024

(65) Prior Publication Data

US 2025/0133299 A1 Apr. 24, 2025

(30) Foreign Application Priority Data

Oct. 20, 2023 (KR) ........................ 10-2023-0141363

(51) Int. Cl.
*H04N 23/80* (2023.01)
*G06T 1/20* (2006.01)
*H04N 23/11* (2023.01)
*H04N 23/13* (2023.01)

(52) U.S. Cl.
CPC ............... *H04N 23/80* (2023.01); *G06T 1/20* (2013.01); *H04N 23/11* (2023.01); *H04N 23/13* (2023.01)

(58) Field of Classification Search
None
See application file for complete search history.

(56) References Cited

U.S. PATENT DOCUMENTS 11,283,991 B2 3/2022 Sharma et al.
11,650,360 B2 5/2023 Hsu et al.
2014/0267790 A1 9/2014 Rabii et al.
2015/0266477 A1* 9/2015 Schmudderich ...... B60W 30/09 701/98

(Continued)

FOREIGN PATENT DOCUMENTS

CN 115719440 A 2/2023
CN 116758223 A * 9/2023 ............. G06T 17/00

(Continued)

OTHER PUBLICATIONS

Extended European Search Report issued on Mar. 11, 2025, in counterpart European Patent Application No. 24206674.4. (12pages in English).

(Continued)

*Primary Examiner* — Bernard Krasnic
(74) *Attorney, Agent, or Firm* — NSIP Law

(57) ABSTRACT

A machine-perspective signal processing method and apparatus are provided. The machine-perspective signal processing method includes selecting a first sensor from among a plurality of sensors, processing output data of the first sensor using first sensor-specific signal processing having a first individual setting specialized for the first sensor and sensor-agnostic signal processing having a common setting of the plurality of sensors, and performing a first task based on the processed output data.

18 Claims, 8 Drawing Sheets

(56) References Cited

U.S. PATENT DOCUMENTS

| | | | | |
|---|---|---|---|---|
| 2016/0063858 | A1* | 3/2016 | Schmüdderich | B60W 30/0956 701/117 |
| 2018/0039821 | A1* | 2/2018 | Gren | G06F 3/04842 |
| 2018/0189970 | A1* | 7/2018 | Balasubramanian | H04W 4/70 |
| 2021/0342605 | A1* | 11/2021 | Walessa | G06F 18/22 |
| 2021/0350584 | A1 | 11/2021 | Han et al. | |
| 2023/0068923 | A1 | 3/2023 | Yamakoshi et al. | |
| 2023/0072423 | A1* | 3/2023 | Osborn | G06F 3/011 |
| 2023/0237383 | A1 | 7/2023 | Luo | |
| 2024/0008833 | A1* | 1/2024 | Preuhs | G06T 7/20 |
| 2024/0137631 | A1* | 4/2024 | Burmak | G02B 5/20 |

FOREIGN PATENT DOCUMENTS

| | | | | |
|---|---|---|---|---|
| JP | 2022-76407 | A | 5/2022 | |
| KR | 20200101321 | A * | 8/2020 | G08B 15/00 |
| KR | 10-2371880 | B1 | 3/2022 | |
| KR | 10-2022-0156905 | A | 11/2022 | |
| WO | WO 2022/097434 | A1 | 5/2022 | |

OTHER PUBLICATIONS

Mosleh, Ali, et al. "Hardware-in-the-loop end-to-end optimization of camera image processing pipelines." Proceedings of the IEEE/CVF Conference on Computer Vision and Pattern Recognition. 2020. (pp. 1-21).

Robidoux, Nicolas, et al. "End-to-end high dynamic range camera pipeline optimization." Proceedings of the IEEE/CVF Conference on Computer Vision and Pattern Recognition. 2021. (pp. 6297-6307).

Tseng, Ethan, et al. "Hyperparameter optimization in black-box image processing using differentiable proxies." ACM Trans. Graph. 38.4, 27-1, 2019. (pp. 1-57).

Tseng, Ethan, et al. "Differentiable compound optics and processing pipeline optimization for end-to-end camera design." ACM Transactions on Graphics (TOG) 40.2, Aug. 2021. (pp. 1-18).

Korean Office Action issued on Sep. 26, 2024, in counterpart Korean Patent Application No. 10-2023-0141363 (3 pages in English, 5 pages in Korean).

* cited by examiner

METHOD AND APPARATUS WITH MACHINE-PERSPECTIVE SIGNAL PROCESSING

CROSS-REFERENCE TO RELATED APPLICATIONS

This application claims the benefit under 35 USC § 119 (a) of Korean Patent Application No. 10-2023-0141363, filed on Oct. 20, 2023, in the Korean Intellectual Property Office, the entire disclosure of which is incorporated herein by reference for all purposes.

BACKGROUND

1. Field

The following description relates to a machine-perspective signal processing method and apparatus.

2. Description of Related Art

In digital imaging, a sensor obtains light from a spectrum passing through a color filter array (CFA). For example, a common CFA is a Bayer pattern with two green (G) channels, one red (R) channel, and one blue (B) channel arranged in a repetitive 2×2 pattern. The Bayer pattern is designed based on human temporal perception abilities. In addition, an output of a sensor, e.g., a raw image, may be processed through image signal processing (ISP, e.g., with an image signal processor) to create an image for a predetermined purpose. ISP is typically performed by a series of pipeline stages implemented in hardware and/or software, and the sensor output, processed by the existing ISP, may be transformed into an image that is in various ways ideal for human vision. Images created by ISP may be utilized in applications designed for humans, such as photography and may also be utilized in machine vision applications, such as autonomous driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes: selecting a first image sensor from among a pool of image sensors; generating a final image by processing an output image of the first image sensor using first sensor-specific image processing having a first individual setting specific to the first image sensor and using sensor-agnostic signal processing having a setting common to the image sensors in the pool of image sensors; and performing a first task based on the final image.

The first individual setting may be different from a second individual setting of second sensor-specific image processing specialized for a second image sensor in the pool of image sensors.

The first individual setting and the second individual setting may differ in a specific image processing operation or in an individual setting value of a same specific image processing operation.

The image sensors in the pool of sensors may be configured to sense in different respective wavelength bands.

The different wavelength bands may include a visible light wavelength band and an infrared wavelength band.

The image sensors may include respective bandpass filters of different spectra positioned in different arrangements.

Each of the image sensors in the pool of sensors may be matched to a predetermined task based on sensor-specific signal processing, and the first image sensor is matched to the first task based on the first sensor-specific image processing.

A second image sensor in the pool of image sensors may be matched to a second task based on second sensor-specific image processing having a second individual setting specialized for the second image sensor.

The first image sensor may be matched to a third task based on third sensor-specific image processing having a third individual setting specialized for the first image sensor.

The sensor-agnostic image processing may include sub-modes, and one of the sub-modes may be selected for the sensor-agnostic image processing depending on an environmental condition.

The environmental condition may include weather, location, illuminance, or a combination thereof.

The first task may be a machine vision task including any one or any combination of any two or more of object detection, object tracking, object classification, and segmentation.

A non-transitory computer-readable storage medium may store for performing any of the methods.

In another general aspect, an electronic apparatus include: sensors; one or more processors; and a memory storing instructions configured to cause the one or more processors to: select a first sensor from among the sensors; generate final data by processing output data outputted from the first sensor using first sensor-specific signal processing having a first individual setting specific to the first sensor and sensor-agnostic signal processing having a setting common to the sensors; and perform a first task based on the final data.

The first individual setting may be different from a second individual setting of second sensor-specific signal processing specialized for the first sensor.

The sensors may be configured to sense signals in different respective wavelength bands.

Each of the sensors may be matched to a predetermined task based on sensor-specific signal processing, and the first sensor is matched to the first task based on the first sensor-specific signal processing.

A second sensor among the sensors may be matched to a second task based on second sensor-specific signal processing having a second individual setting specific to the second sensor.

The first sensor may be matched to a third task based on third sensor-specific signal processing having a third individual setting specialized for the first sensor.

The sensor-agnostic signal processing may include sub-modes, and one of the sub-modes may be selected for the sensor-agnostic signal processing depending on an environmental condition.

Other features and aspects will be apparent from the following detailed description, the drawings, and the claims.

Figure 1:
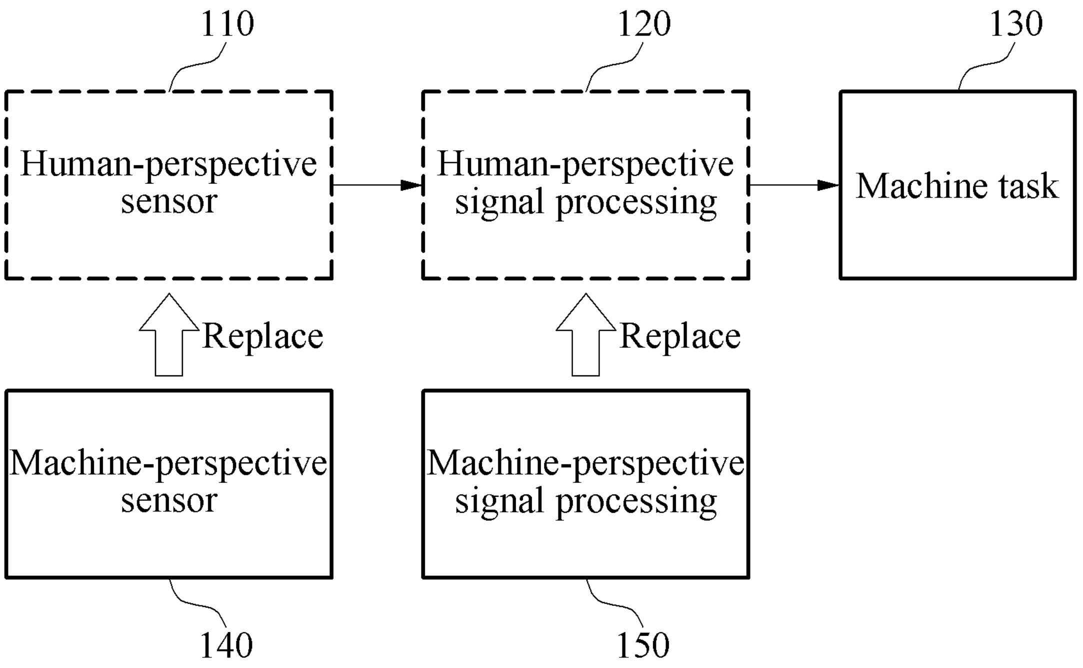
FIG. 1 illustrates an example of a machine task using a machine-perspective sensor and machine-perspective signal processing, according to one or more embodiments.

Throughout the drawings and the detailed description, unless otherwise described or provided, it may be understood that the same or like drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a machine task using a machine-perspective sensor and machine-perspective signal processing, according to one or more embodiments. Referring to FIG. 1, conventionally, a human-perspective sensor 110 and human-perspective signal processing 120 are used to imitate or model characteristics of human vision. The human-perspective sensor 110 and the human-perspective signal processing 120 may be used not only for an application designed for a human, such as photography, but also for a machine task 130. For example, the human-perspective sensor 110 may be an image sensor based on a Bayer pattern and the human-perspective signal processing 120 may be a pipeline of image signal processing (ISP) tuned by a human. In short, selection and/or configuration of a sensor and selection and/or configuration of an ISP pipeline to process the sensor's images is generally oriented towards end-use by humans, i.e., displaying an image. However, such human-perspective approach to selection and configuration may not be optimal when a machine task is the intended use of a sensed and processed image. That is, the properties of an image may not be optimal for the machine task. It may not be readily apparent which sensor selection/configuration and which pipeline selection/configuration is optimal for a given machine task.

As a non-limiting example, the machine task 130 may be a machine vision task including any one or any combination of any two or more of object detection, object tracking, object classification, and segmentation. The machine task 130 may be performed by a machine (e.g., may use an image for various computational tasks rather than human viewing). Since image data provided to the machine task 130 through the human-perspective sensor 110 and the human-perspective signal processing 120 is generated from a human-centric perspective, a capability of a machine may not be fully realized in the machine task 130 when the machine task 130 is based on this human-centric image data.

The machine task 130 may be better accomplished when performed based on a machine-perspective sensor 140 (e.g., selection/configuration of a sensor) and machine-perspective signal processing 150 (e.g., selection/configuration of a signal processing) instead of the human-perspective sensor 110 and the human-perspective signal processing 120. For example, instead of using an image sensor based on the Bayer pattern and a pipeline of ISP tuned by a human (or tuned to the human vision system), a different sensor and different signal processing that are selected/configured for improving the performance of the machine task 130 may be used as the machine-perspective sensor 140 and the machine-perspective signal processing 150. A technique, such as a Bayer pattern, that imitates a human cone cell may primarily focus on using visible light, and it may be difficult to know whether such a technique is optimal for any given machine vision task. For example, in a low-light environment, it may be advantageous to use information from a white channel that uses the entire spectrum of visible light (without any color filter) in order to provide high photosensitivity. In addition, because predetermined colors tend to be used for many traffic signal/sign systems, lanes, or other key pieces of information used for autonomous driving), the amount of obtainable driving-related pieces of information (for example) may vary depending on which spectrum is used (i.e., which sensor and/or sensor setting/filter is used).

A score of the machine task 130 may be measured for various sensors (e.g., which sensor and/or which sensor settings/filters) and various signal processing settings (e.g., which signal processing and/or which signal processing configuration settings). The machine-perspective sensor 140 and the machine-perspective signal processing 150 that have the highest score may be set to be the sensor and the signal processing setting used for the machine task 130. For example, various color spectra may be obtained depending on a physical property and a process. Using a producible (available) spectrum pool as a kind of search space, sensors with various filter arrays may be configured through repeated combinations of individual color pixels (of the sensors). Incidentally, the techniques described herein are not limited to sensors that use visible light colors (e.g., infrared sensors or others may be used). The machine-perspective sensor 140 and the machine-perspective signal processing 150 may be selected/configured to maximize the performance of the machine task 130.

Figure 2:
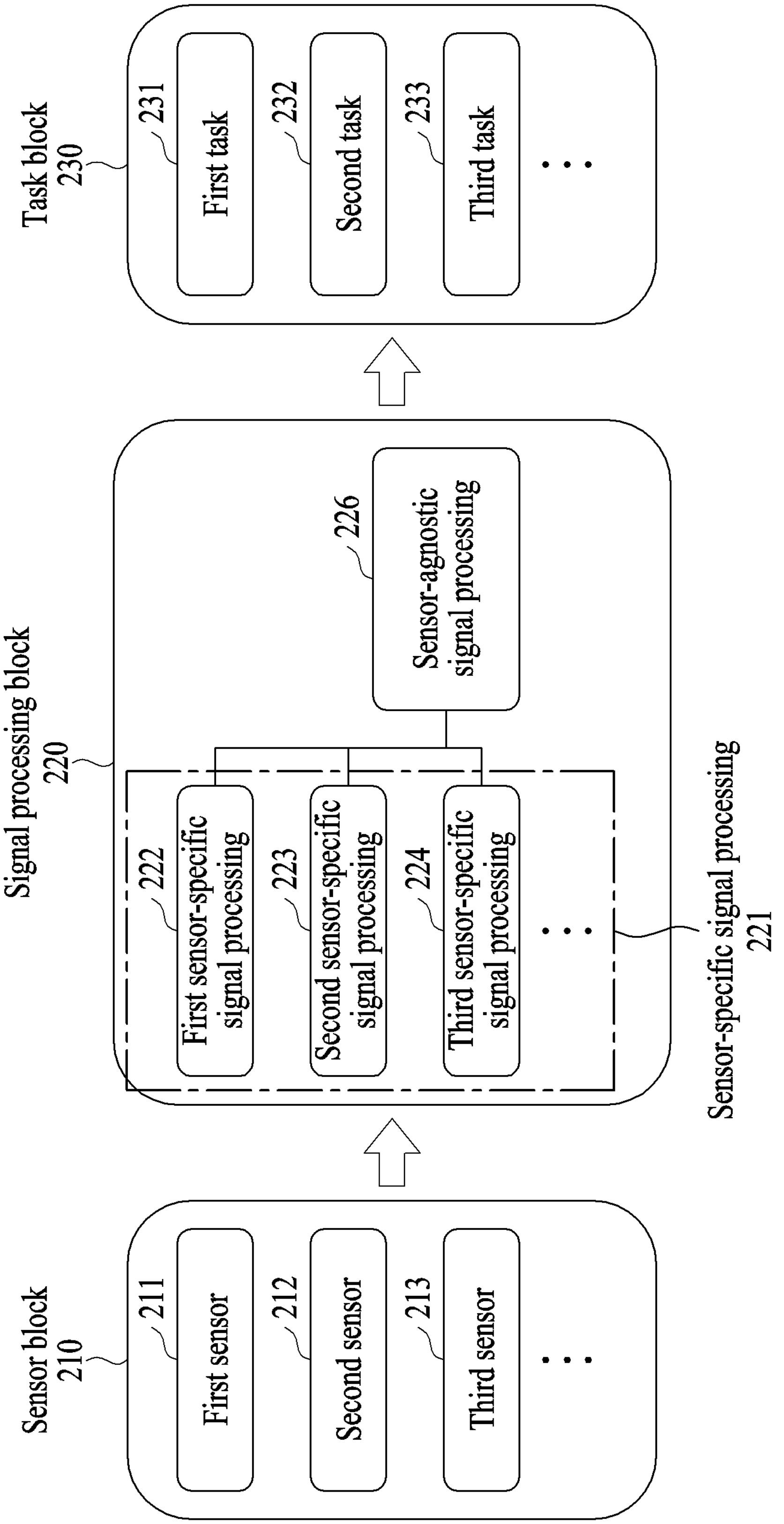
FIG. 2 illustrates an example of a sensor block, a signal processing block, and a task block, according to one or more embodiments.

FIG. 2 illustrates an example of a sensor block, a signal processing block, and a task block, according to one or more embodiments. Referring to FIG. 2, any of the tasks (e.g., a first task 231, a second task 232, and a third task 233) of a task block 230 may potentially be performed based on (i) any of the sensors among a set of sensors (e.g., a first sensor 211, a second sensor 212, and a third sensor 213) of a sensor block 210, (ii) any of the types of signal processing (e.g., sensor-specific signal processing 221) of a signal processing block 220, and (iii) sensor-agnostic signal processing 226 of the signal processing block 220.

For example, for the first task 321, (i) the first sensor 211 may be selected from among the set of sensors of the sensor block 210, (ii) signal processing on image data from the first sensor 211 may be performed by selecting and using first sensor-specific signal processing 222 having a first individual setting specialized for (specific to) the first sensor 211, and (iii) the sensor-agnostic signal processing 226 (having a common setting of the plurality of sensors of the sensor block 210); the first task 231 may be performed based on a signal/image result.

The sensors in the set of sensors of the sensor block 210 may each sense electromagnetic (light) energy in respective different wavelength bands (possibly overlapping). For example, the different wavelength bands may include a visible light wavelength band (e.g., a red wavelength band, a green wavelength band, a blue wavelength band, or a combination thereof), a signal in an infrared wavelength band (e.g., a near-infrared (NIR) wavelength band), a radio signal of various wavelength bands, and the like. For example, the set of sensors may include a sensor configured to capture a visible light signal, a sensor configured to capture an infrared signal, a sensor configured to capture a visible light signal and an infrared signal (e.g., simultaneously), a radar configured to use a radio signal, a LiDAR configured to use a light wave signal, and the like.

The set of sensors of the sensor block 210 may include sensors that include bandpass filters of different spectra positioned in different arrangements. The bandpass filters may be arranged in an array of pixels (pixel-filters) such as a color filter array (CFA). For example, pixels corresponding to bandpass filters that transmit electromagnetic waves in a white (W), red (R), green (G), cyan (C), magenta (M), or NIR wavelength may be arranged in any of a variety of repeating patterns, such as 1×1, 2×2, 3×3, and 4×4, within a CFA.

Each signal processing in the sensor-specific signal processing 221 may have an individual setting specialized for a corresponding predetermined sensor (in the sensor block 210); each sensor may have more than one signal processing. The sensor-agnostic signal processing 226 may have a common setting(s) that is used for all sensors (a setting applicable to all of the sensors). For example, when an ISP pipeline is configured by the signal processing block 220, a sensor-specific stage of the ISP pipeline may be configured according to a sensor-specific signal processing and a stage of the ISP pipeline that is applicable to all of the sensors in the sensor block 210 may be configured according to the sensor-agnostic signal processing 226.

Types of sensor-specific signal processing (e.g., the first, second, and third sensor-specific signal processing 222, 223, 224) may have individual settings different from one other. For example, an individual setting of the first sensor-specific signal processing 222 may be different from an individual setting of the second sensor-specific signal processing 223 (although any two sensors might have a same sensor-specific setting, generally, their settings will differ). The individual settings may specify different detailed signal processing operations (e.g., which pipeline stages are active) and/or different individual setting values (e.g., of the stages). For example, the first sensor-specific signal processing 222 may include more detailed signal processing operations compared to the second sensor-specific signal processing 223. For example, detailed signal processing operations may configure an ISP pipeline to include and/or have settings for, stages such as demosaicing, denoising, auto white balance (AWB), and a color correction matrix (CCM). Even when, for example, the first sensor-specific signal processing 222 and the second sensor-specific signal processing 223 include a same signal processing operation/stage, an individual setting value of that operation/stage in the first sensor-specific signal processing 222 may be different from an individual setting value of that operation/stage in the second sensor-specific signal processing 223. For example, a parameter value used for performing demosaicing, denoising, AWB, CCM, or the like may be set to one value in the detailed signal processing operation of the first sensor-specific signal processing 222 and another value in the detailed signal processing operation of the second sensor-specific signal processing 223.

The tasks (e.g., the first task 231, the second task 232, and the third task 233) of the task block 230 may correspond to respective machine tasks. Each machine task may be a type of task performed by a machine to imitate a human activity (e.g., using machine learning techniques), for example. For example, the machine task may include a machine vision task that imitates a vision-based human activity. The machine vision task may include object detection, object tracking, object classification, and segmentation, to name some examples. So, for example, the first, second, and third tasks 231, 232, 233 may be, respectively, object detection, object tracking, and object classification. Any of various applications, such as autonomous driving, may be performed based on the machine vision task.

Each of the tasks in the task block 230 may be matched to both a task-optimal individual sensor of the sensor block 210 and a task-optimal individual signal processing of the sensor-specific signal processing 221. These matches may be conducted in advance through an optimization process to match each task with a sensor and a sensor-specific signal processing that are optimal to the task. In other words, combinations of a sensor and a sensor-specific signal processing that maximizes the performance of the respective tasks may be matched to the tasks. For example, through the optimization process, the first task 231 may be matched to the first sensor 211 and the first sensor-specific signal processing 222; those having been found to be an optimal combination for the first task 231. Similarly, the second task 232 may be matched to the second sensor 212 and the second sensor-specific signal processing 223; those having been found to be an optimal combination for the second task 232. The same sensor may be matched to different tasks, but in combination with different sensor-specific signal processings. For example, the first sensor 211 may be matched to the first task 231 together with the first sensor-specific signal processing 222. At the same time, the first sensor 211 may be matched to the third task 233 together with the third sensor-specific signal processing 224.

Figure 3:
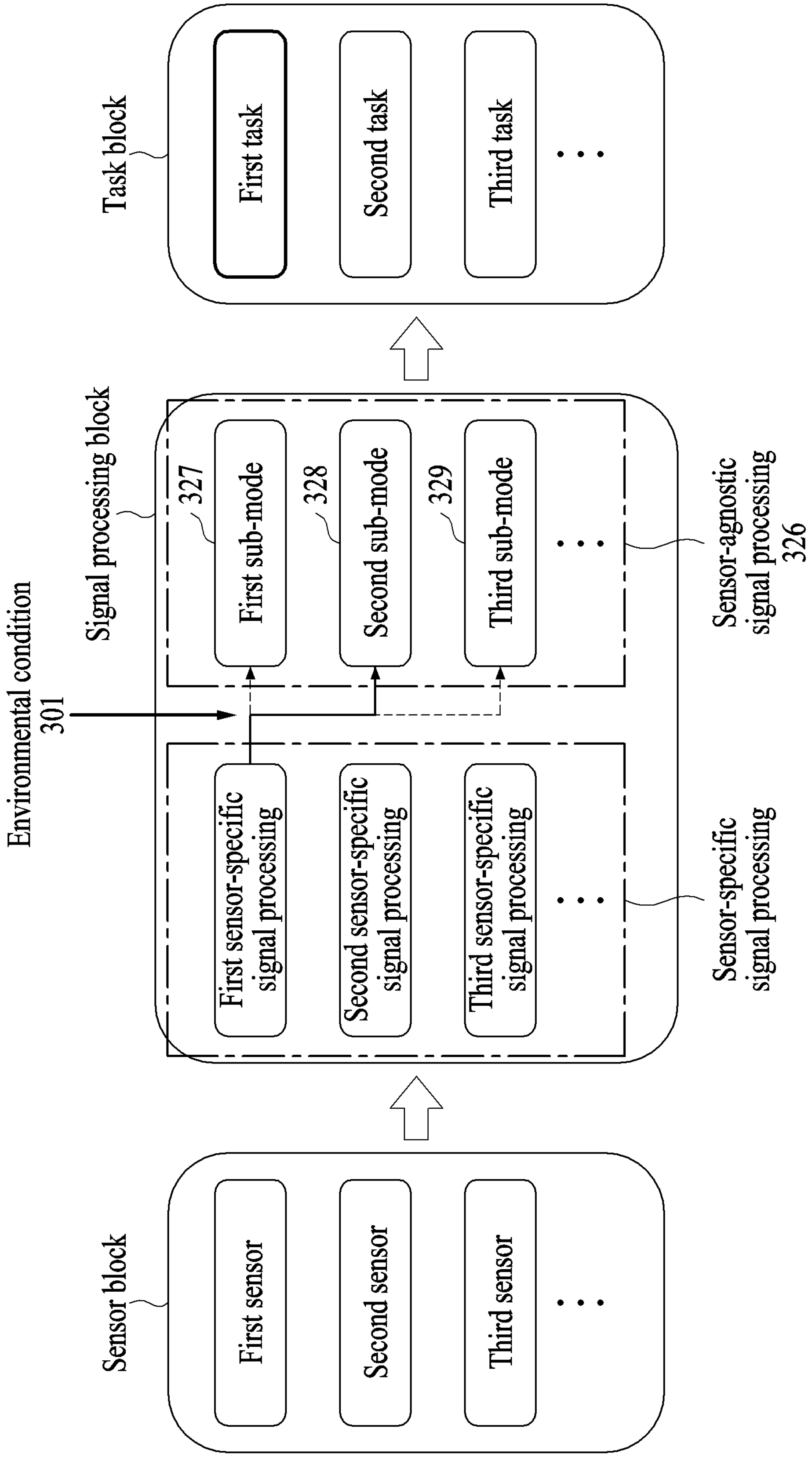
FIG. 3 illustrates an example of a task using sub-modes of sensor-agnostic signal processing, according to one or more embodiments.

FIG. 3 illustrates an example of a task using sub-modes of sensor-agnostic signal processing, according to one or more embodiments. Referring to FIG. 3, unlike the examples described with reference to FIG. 2, sensor-agnostic signal processing 326 may include sub-modes (e.g., a first sub-mode 327, a second sub-mode 328, and a third sub-mode 329). One of the sub-modes may be selected for the sensor-agnostic signal processing 326 depending on an environmental condition 301. For example, the environmental condition 301 may include weather, location, illuminance, a type of vicinity, or a combination thereof. The indicated weather may include clear weather, snowy weather, rainy weather, foggy weather, and the like. A location may include a tunnel, an urban area, a suburban area, a city, a country, and the like. Illuminance may include high illuminance and low illuminance. The environmental condition 301 may be obtained through sensors of a sensor block, sensors other than the sensors of the sensor block, a network, or a combination thereof.

For example, when weather is used as the environmental condition 301, one of the sub-modes may be selected depending on the weather. For example, the first sub-mode 327 may be used for the sensor-agnostic signal processing 326 when the weather is clear, the second sub-mode 328 may be used for the sensor-agnostic signal processing 326 when the weather is rainy or snowy, and the third sub-mode 329 may be used for the sensor-agnostic signal processing 326 when the weather is foggy. The sub-modes may have different individual settings unrelated to a sensor and related to the environmental condition 301. When the weather is indicated as being clear, the first sub-mode 327 may be used for the sensor-agnostic signal processing 326, regardless of which sensor or sensor-specific signal processing is used for a given task.

Figure 4:
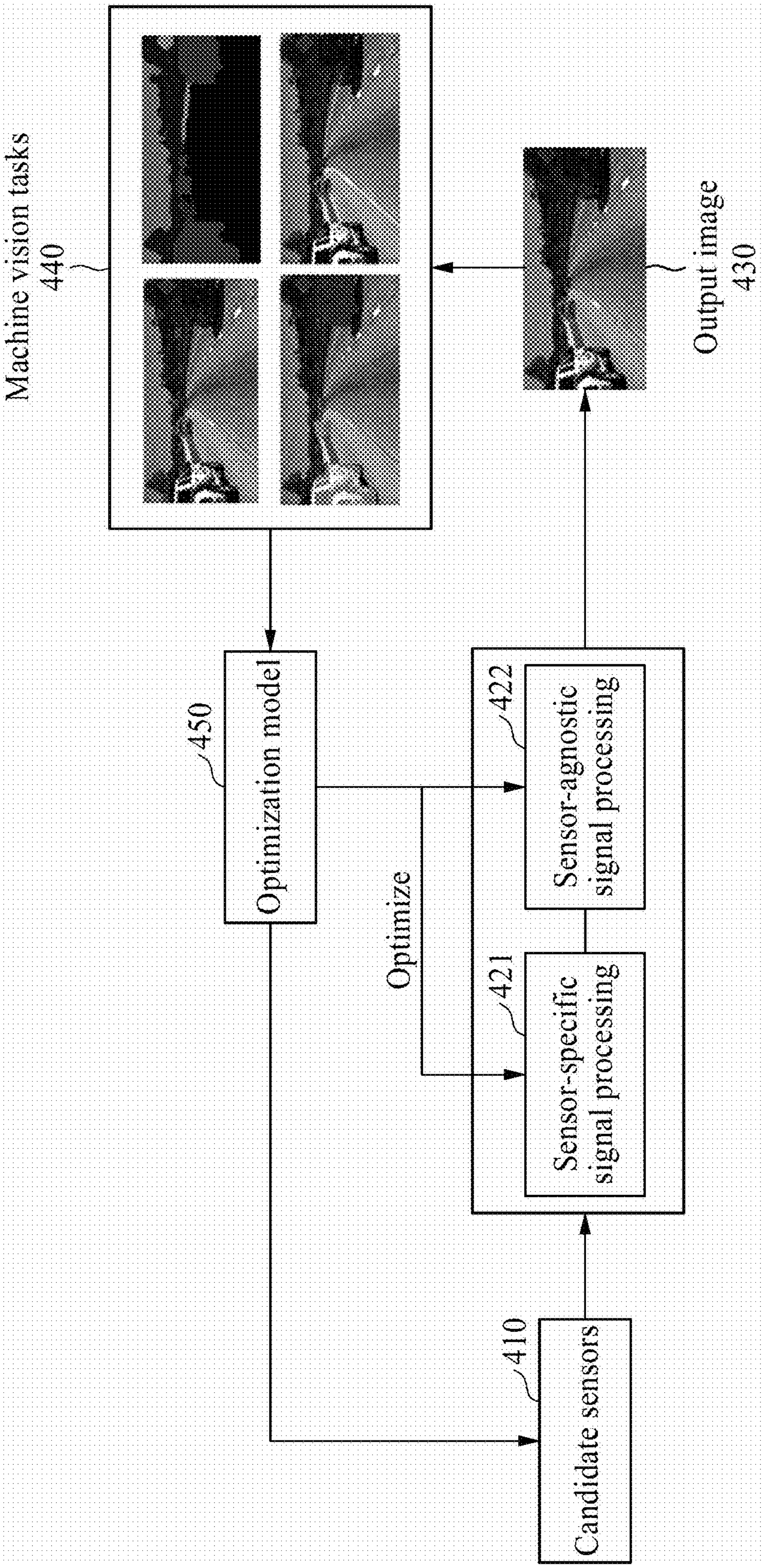
FIG. 4 illustrates an example of a machine-perspective optimization process, according to one or more embodiments.

FIG. 4 illustrates an example of a machine-perspective optimization process, according to one or more embodiments. Referring to FIG. 4, a sensor pool may be derived by an optimization model 450 from candidate sensors 410, and sensor-specific signal processing 421 and sensor-agnostic signal processing 422 may be determined for the sensor pool. For example, detailed signal processing operations (e.g., which pipeline stages to use) and individual setting values (e.g., of the stages) of the sensor-specific signal processing 421 and the sensor-agnostic signal processing 422 may be determined.

The optimization model 450 may select any candidate sensor from among the candidate sensors 410. The sensor-specific signal processing 421 and the sensor-agnostic signal processing 422 may be performed on image data (e.g., a raw image) from the corresponding candidate sensor. An image processing result may be an output image 430. Each of the machine vision tasks 440 may be performed based on the output image 430. The machine vision tasks 440 may include any one or any combination of any two or more of object detection, object tracking, object classification, and segmentation. The output image 430 and the machine vision tasks 440 are non-limiting examples of a machine task; optimization may be performed on other machine vision tasks.

The optimization model 450 may optimize the sensor-specific signal processing 421 and the sensor-agnostic signal processing 422 based on scores of the machine vision tasks 440. For example, detailed signal processing operations (e.g., pipeline stages) and individual setting values (e.g., settings of the stages) of the sensor-specific signal processing 421 and the sensor-agnostic signal processing 422 may be optimized. The optimization model 450 may repeatedly perform optimization operations for the candidate sensors 410. As a result, a sensor pool may be derived from the candidate sensors 410 and the sensor-specific signal processing 421 and the sensor-agnostic signal processing 422 for the sensor pool may be determined.

Figure 5:
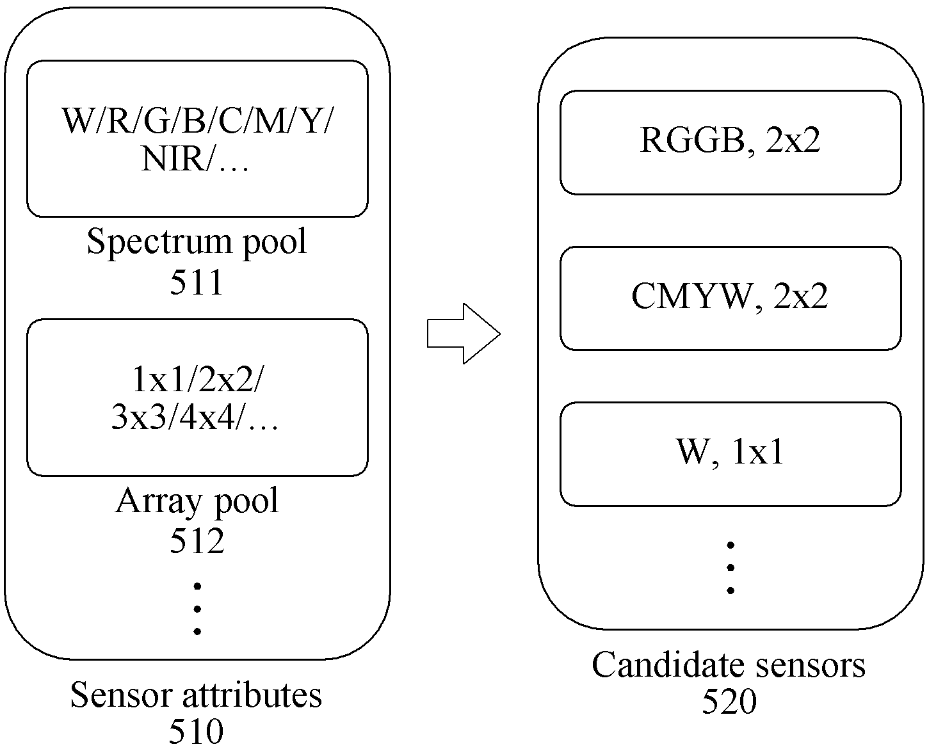
FIG. 5 illustrates an example of a process of configuring candidate sensors, according to one or more embodiments.

To reiterate, for each machine vision task 440, different combinations of sensors, sensor-specific signal processing, and sensor-agnostic signal processing may be used to generate respective output images, and the output images may be scored for their suitability (optimality) for the respective machine vision tasks 440. For each machine vision task, an optimal (highest scoring) combination of sensor, sensor-specific signal processing, and sensor-agnostic signal processing may be set as the optimal combination for the corresponding machine vision task, FIG. 5 illustrates an example of a process of configuring candidate sensors (e.g., candidate sensors 410), according to one or more embodiments. Referring to FIG. 5, a spectrum pool 511 may include indicia of spectra in various bands, such as W, R, G, blue (B), C, M, and NIR. An array pool 512 may include indicia of various batch patterns such as 1×1, 2×2, 3×3, and 4×4. Candidate sensors 520 may be obtained by combining sensor attributes 510 in various ways. For example, a sensor using a pattern in which RGGB is repetitively arranged in a 2×2 grid, a sensor using a pattern in which CMYW is repetitively arranged in a 2×2 grid, a sensor using a pattern in which W is repetitively arranged in a 1×1 grid, and the like may be obtained as the candidate sensors 520. Numerous candidate sensors (e.g., the candidate sensors 520) may be obtained in an optimization process, and a sensor pool may be configured with the candidate sensors 520.

Figure 6:
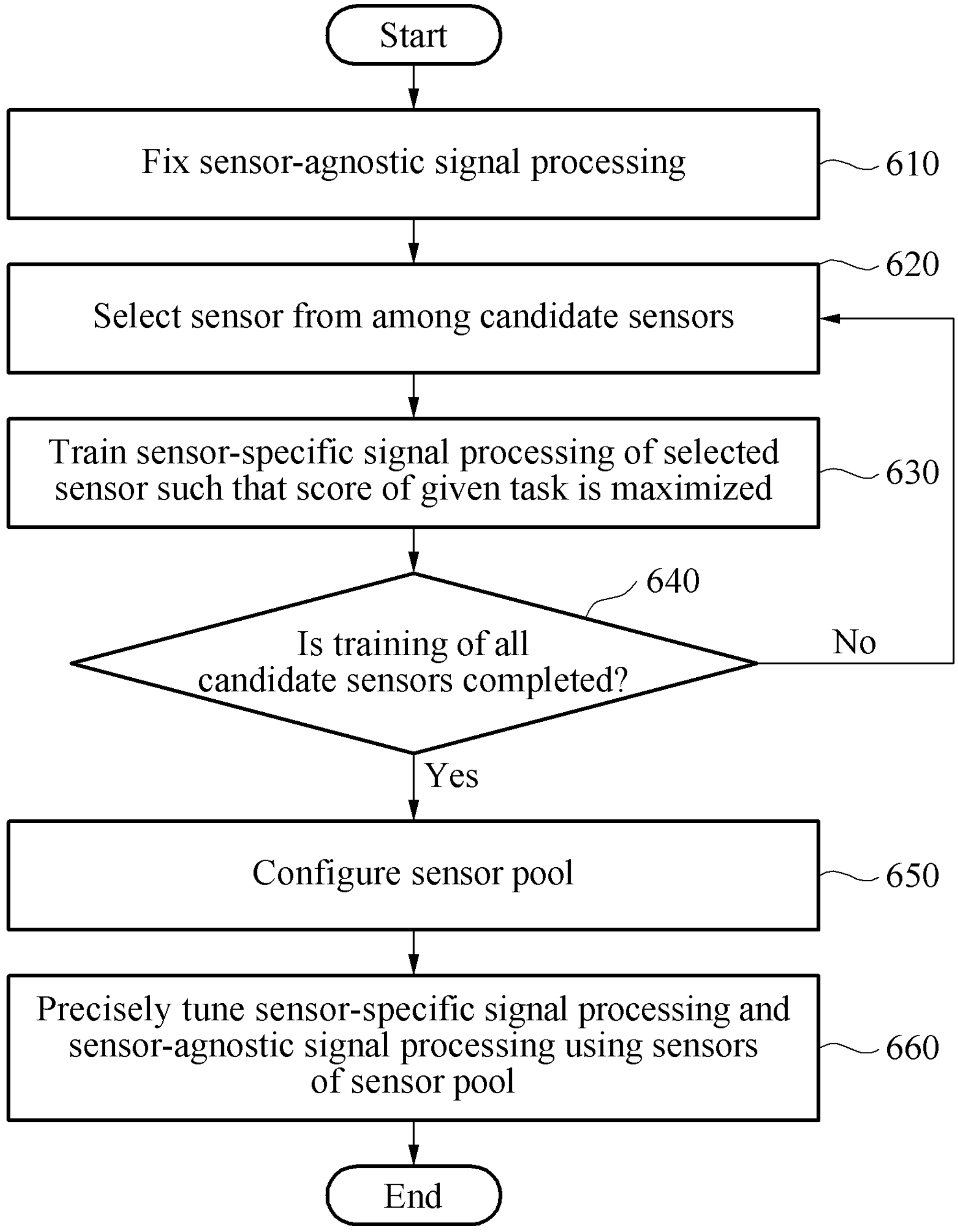
FIG. 6 illustrates an example of a process of optimizing a signal processing block and configuring a sensor pool, according to one or more embodiments.

FIG. 6 illustrates an example of a process of optimizing a signal processing block (e.g., signal processing block 220) and configuring a sensor pool (e.g., sensor block 210), according to one or more embodiments. Referring to FIG. 6, sensor-agnostic signal processing may be fixed in operation 610 and a sensor may be selected from among candidate sensors in operation 620. Initially, the sensor-agnostic signal processing may be set based on known signal processing (e.g., a human-perspective signal processing). In operation 630, sensor-specific signal processing of the selected sensor may be trained such that a score of a given task is maximized. The training may be performed by iteratively updating a detailed signal/image processing operation of the sensor-specific signal processing and an individual setting value.

In operation 640, whether training of all of the candidate sensors is completed is checked. When there is a candidate sensor on which training is yet to be performed, operation 620 may be performed again on another candidate sensor. When the training of all of the candidate sensors is completed, the sensor pool may be configured in operation 650. The sensor pool may be configured with sensors that excel at a given task among the candidate sensors. In operation 660, using the sensors of the sensor pool, the sensor-specific signal processing and the sensor-agnostic signal processing may be precisely tuned. In operation 660, unlike in operation 610, the sensor-agnostic signal processing may be changed.

Figure 7:
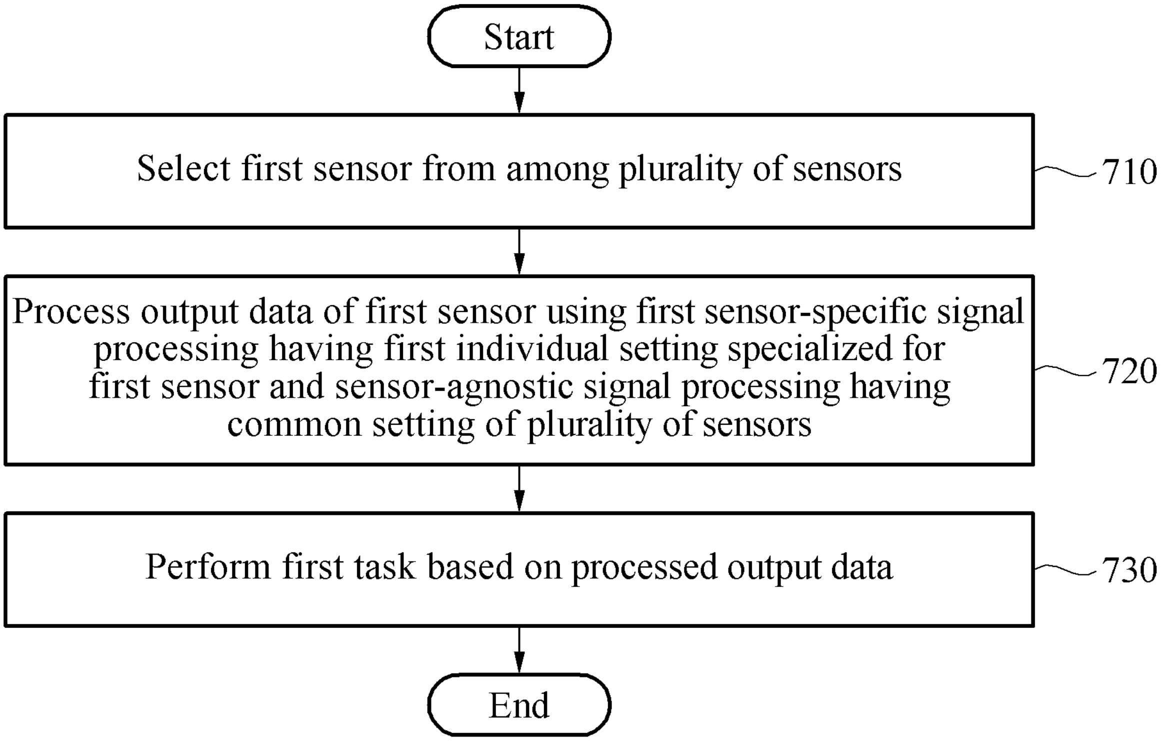
FIG. 7 illustrates an example of a machine-perspective signal processing method, according to one or more embodiments.

FIG. 7 illustrates an example of a machine-perspective signal processing method, according to one or more embodiments. Referring to FIG. 7, an electronic apparatus may select a first sensor from among available sensors in operation 710, process output data (e.g., raw image data) of the first sensor using first sensor-specific signal processing having a first individual setting specialized for the first sensor and sensor-agnostic signal processing having a common setting of the plurality of sensors in operation 720, and perform a first task based on the processed output data in operation 730.

The first individual setting may be different from a second individual setting of second sensor-specific signal processing specialized for a second sensor of the plurality of sensors.

The first individual setting and the second individual setting may differ in one or more of a detailed signal processing operation and an individual setting value.

The sensors may sense signals in different wavelength bands.

The different wavelength bands may include a visible wavelength band and an infrared wavelength band.

The sensors may include sensors including bandpass filters of different spectra arranged in different ways.

Each of the sensors may be matched to a predetermined task based on sensor-specific signal processing and the first sensor may be matched to the first task based on the first sensor-specific signal processing.

The second sensor of the plurality of sensors may be matched to a second task based on the second sensor-specific signal processing having the second individual setting specialized for the second sensor.

The first sensor may be matched to a third task based on third sensor-specific signal processing having a third individual setting specialized for the first sensor.

The sensor-agnostic signal processing may include sub-modes, and one of the sub-modes may be selected for processing the sensor-agnostic signal processing depending on an environmental condition.

The environmental condition may include weather, location, illuminance, or a combination thereof.

The first task may be a machine vision task including one or more of detection, tracking, classification, and segmentation.

In addition, the descriptions provided with reference to FIGS. 1 to 6 and 8 may apply to the signal processing method of FIG. 7.

Figure 8:
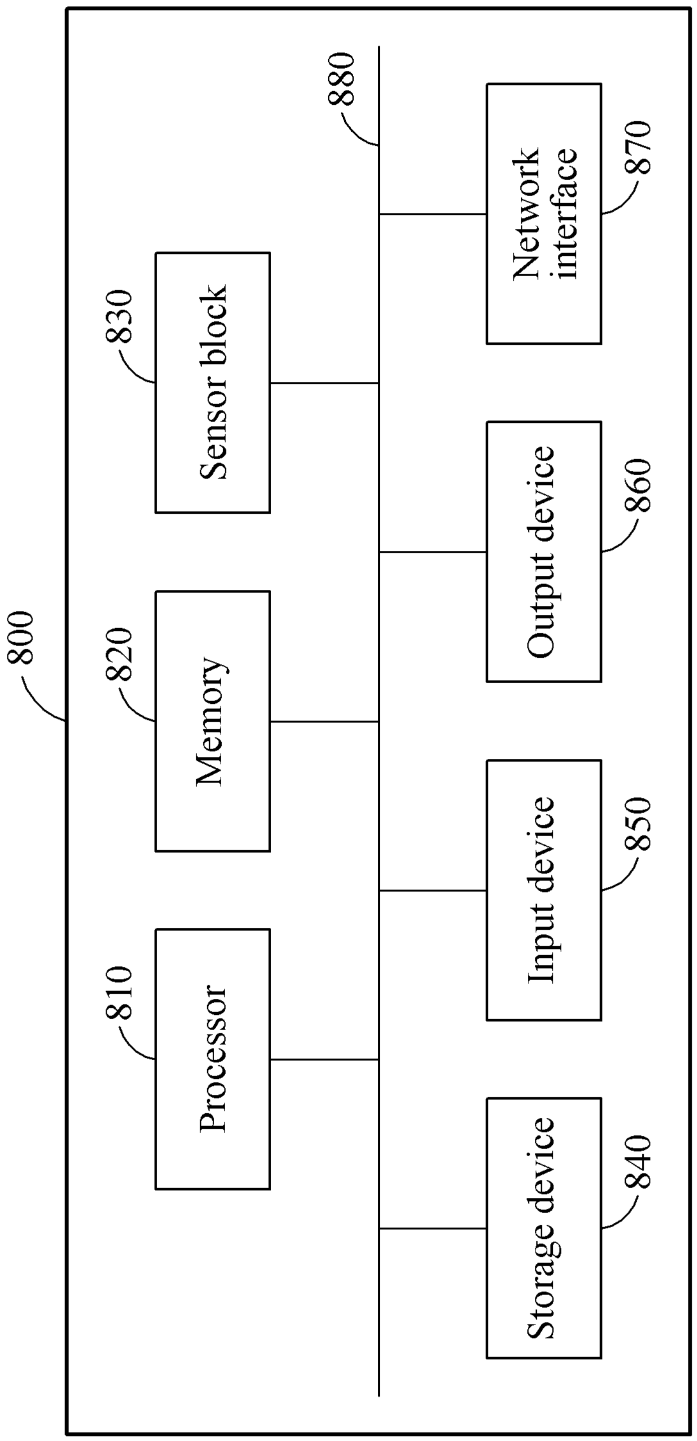
FIG. 8 illustrates an example of a configuration of an electronic apparatus, according to one or more embodiments.

FIG. 8 illustrates an example of a configuration of an electronic apparatus, according to one or more embodiments. Referring to FIG. 8, an electronic apparatus 800 may include a processor 810, a memory 820, a sensor block 830, a storage device 840, an input device 850, an output device 860, and a network interface 870. The processor 810, the memory 820, the sensor block 830, the storage device 840, the input device 850, the output device 860, and the network interface 870 may communicate with each other via a communication bus 880. For example, the electronic apparatus 800 may be implemented as at least a part of a mobile device, such as a mobile phone, a smartphone, a personal digital assistant (PDA), a netbook, a tablet computer, or a laptop computer, a wearable device, such as a smart watch, a smart band, or smart glasses, a computing device, such as a desktop or a server, a home appliance, such as a television, a smart television, or a refrigerator, a security device, such as a door lock, or a vehicle such as an autonomous vehicle, or a smart vehicle.

The processor 810 may execute instructions and functions in the electronic apparatus 800. For example, the processor 810 may process instructions stored in the memory 820 or the storage device 840. The processor 810 may perform the operations described with reference to FIGS. 1 to 7. When the functions and instructions are executed by the processor 810, the electronic apparatus 800 may be controlled accordingly. For example, when executed by the processor 810, the instructions may cause the electronic apparatus 800 to select a first sensor from among a plurality of sensors, process output data of the first sensor using first sensor-specific signal processing having a first individual setting specialized for the first sensor and sensor-agnostic signal processing having a common setting of the plurality of sensors, and perform a first task based on the processed output data.

The memory 820 may include a non-transitory computer-readable storage medium or a non-transitory computer-readable storage device. The memory 820 may store instructions that are to be executed by the processor 810 and store information associated with software and/or applications when the software and/or applications are being executed by the electronic apparatus 800.

The sensor block 830 may include a plurality of sensors. For example, the plurality of sensors may include a sensor that captures a visible light signal, a sensor that captures an infrared signal, a sensor that captures a visible light signal and an infrared signal, a radar that uses a radio wave signal, a LIDAR that uses a light wave signal, and the like.

The storage device 840 may include a non-transitory computer-readable storage medium or a non-transitory computer-readable storage device. The storage device 840 may store a larger amount of information compared to the memory 820 and store information for a long period of time. For example, the storage device 840 may include a magnetic hard disk, an optical disc, flash memory, a floppy disk, or other types of non-volatile memory known in the art.

The input device 850 may receive an input from a user through a traditional input scheme using a keyboard and a mouse and through a new input scheme, such as a touch input, a voice input, or an image input. The input device 850 may include, for example, a keyboard, a mouse, a touch screen, a microphone, or any other device that may detect an input from the user and transmit the detected input to the electronic apparatus 800. The output device 860 may provide an output of the electronic apparatus 800 to the user through a visual, auditory, or haptic channel. The output device 860 may include, for example, a display, a touch screen, a speaker, a vibration generator, or any other device that may provide the output to the user. The network interface 870 may communicate with an external device through a wired or wireless network.

The computing apparatuses, the electronic devices, the processors, the memories, the image sensors, the displays, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD−ROMs, CD−Rs, CD+Rs, CD−RWs, CD+RW, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An image processing method comprising:

selecting a first image sensor from among a pool of image sensors according to a first predetermined machine task to be performed;

generating a final image by processing an output image of the first image sensor using first sensor-specific image processing having a first individual setting specific to the first image sensor and using sensor-agnostic signal processing having a setting common to the image sensors in the pool of image sensors; and performing the first predetermined machine task based on the final image, wherein each of the image sensors in the pool of image sensors is matched to a predetermined machine task based on sensor-specific signal processing, and the first image sensor is matched to the first predetermined machine task based on the first sensor-specific image processing.

2. The image processing method of claim 1, wherein the first individual setting is different from a second individual setting of second sensor-specific image processing specialized for a second image sensor in the pool of image sensors.

3. The image processing method of claim 2, wherein the first individual setting and the second individual setting differ in a specific image processing operation or in an individual setting value of a same specific image processing operation.

4. The image processing method of claim 1, wherein the image sensors in the pool of image sensors are configured to sense in different respective wavelength bands.

5. The image processing method of claim 4, wherein the different wavelength bands comprise a visible light wavelength band and an infrared wavelength band.

6. The image processing method of claim 1, wherein the image sensors in the pool of image sensors comprising respective bandpass filters of different spectra positioned in different arrangements.

7. The image processing method of claim 1, wherein a second image sensor in the pool of image sensors is matched to a second task based on second sensor-specific image processing having a second individual setting specialized for the second image sensor.

8. The image processing method of claim 1, wherein the first image sensor is matched to a third task based on third sensor-specific image processing having a third individual setting specialized for the first image sensor.

9. The image processing method of claim 1, wherein the sensor-agnostic image processing comprises sub-modes, and one of the sub-modes is selected for the sensor-agnostic image processing depending on an environmental condition.

10. The image processing method of claim 9, wherein the environmental condition comprises weather, location, illuminance, or a combination thereof.

11. The image processing method of claim 1, wherein the first task is a machine vision task comprising any one or any combination of any two or more of object detection, object tracking, object classification, and segmentation.

12. A non-transitory computer-readable storage medium storing instructions that, when executed by a processor, cause the processor to perform the image processing method of claim 1.

13. An electronic apparatus comprising:

sensors comprising two or more: image sensors, infrared sensors, LiDAR sensors, or radar sensors;

one or more processors; and a memory storing instructions configured to cause the one or more processors to:

select a first sensor from among the sensors according to a first predetermined machine task to be performed;

generate final data by processing output data outputted from the first sensor using first sensor-specific signal processing having a first individual setting specific to the first sensor and sensor-agnostic signal processing having a setting common to the sensors; and perform the first predetermined machine task based on the final data, wherein each of the sensors is matched to a predetermined machine task based on sensor-specific signal processing, and the first sensor is matched to the first predetermined machine task based on the first sensor-specific signal processing.

14. The electronic apparatus of claim 13, wherein the first individual setting is different from a second individual setting of second sensor-specific signal processing specialized for the first sensor.

15. The electronic apparatus of claim 13, wherein the sensors are configured to sense signals in different respective wavelength bands.

16. The electronic apparatus of claim 13, wherein a second sensor among the sensors is matched to a second task based on second sensor-specific signal processing having a second individual setting specific to the second sensor.

17. The electronic apparatus of claim 13, wherein the first sensor is matched to a third task based on third sensor-specific signal processing having a third individual setting specialized for the first sensor.

18. The electronic apparatus of claim 13, wherein the sensor-agnostic signal processing comprises sub-modes, and one of the sub-modes is selected for the sensor-agnostic signal processing depending on an environmental condition.

* * * * *